United States Patent [19]

Muggli et al.

[11] Patent Number: 4,555,634

[45] Date of Patent: Nov. 26, 1985

[54] OPTICAL SMOKE DETECTOR WITH CONTAMINATION DETECTION CIRCUITRY

[75] Inventors: Jürg Muggli; Heinz Güttinger; Zoltan Horvath, all of Männedorf, Switzerland

[73] Assignee: Cerberus AG, Männedorf, Switzerland

[21] Appl. No.: 439,059

[22] Filed: Nov. 3, 1982

[30] Foreign Application Priority Data

Nov. 11, 1981 [CH] Switzerland ........................ 7248/81

[51] Int. Cl.[4] ........................ G01N 21/53; G08B 17/10

[52] U.S. Cl. .................................... 250/565; 250/574; 340/630; 356/439

[58] Field of Search ............... 250/573, 574, 575, 564, 250/565; 340/630; 356/338, 343, 438, 439

[56] References Cited

U.S. PATENT DOCUMENTS

| | | | |
|---|---|---|---|
| 3,922,655 | 11/1975 | Lecuyer | 250/574 X |
| 3,922,656 | 11/1975 | Horvath et al. | 356/439 X |
| 4,011,458 | 3/1977 | Malinowski | 250/574 X |
| 4,180,742 | 12/1979 | Malinowski | 250/574 |
| 4,206,456 | 6/1980 | Malinowski | 340/630 |
| 4,242,673 | 12/1980 | Cooper | 250/574 X |

FOREIGN PATENT DOCUMENTS

| | | |
|---|---|---|
| 0015007 | 2/1980 | European Pat. Off. . |
| 0014779 | 6/1982 | European Pat. Off. . |

OTHER PUBLICATIONS

Patent Abstracts of Japan, vol. 3, No. 107, Sep. 8, 1979, p. 160E136.

*Primary Examiner*—Edward P. Westin
*Attorney, Agent, or Firm*—Werner W. Kleeman

[57] ABSTRACT

A smoke detector is disclosed having a radiation source operated in a pulsed mode. Externally of a direct radiation region of the radiation source there is arranged a radiation receiver which, in the presence of smoke or other particles emanating from a combustion process and located in the radiation region, is impinged by scattered radiation and delivers an output signal to an evaluation circuit. The evaluation circuit contains switching elements which, when the number of source output signals or pulses exceeds a predetermined threshold value for the number of source output pulses, delivers an alarm signal. Near to the radiation receiver there is arranged a reference cell in the direct radiation beam of the radiation source, this reference cell controlling the emission of radiation by the radiation source. Further, there is provided circuitry which, in the presence of a slow change in the amplitude of the receiver output pulse, adjusts an amplitude threshold value set for the amplitude of the receiver output pulse at a rate corresponding to a time-constant of more than one minute. Consequently, there is obtained an output signal of the radiation receiver which is dependent upon the smoke density and which is independent of the contamination or soiling of the smoke detector.

15 Claims, 3 Drawing Figures

OPTICAL SMOKE DETECTOR WITH CONTAMINATION DETECTION CIRCUITRY

CROSS REFERENCE TO RELATED APPLICATION

This application is related to the commonly assigned, copending Canadian application Ser. No. 06/439,060, filed Nov. 3, 1982, entitled "Smoke Detector", now granted as U.S. Pat. No. 4,524,281 on June 18, 1985.

BACKGROUND OF THE INVENTION

The present invention relates to a new and improved construction of a smoke detector.

Generally speaking, the smoke detector of the present development is of the type containing a radiation source operated in a pulsed mode and delivering corresponding source output pulses. A radiation receiver is provided externally of a direct radiation region of the radiation source and which, in the presence of smoke in the radiation region, is impinged by scattered radiation and delivers output signals. There is also provided an evaluation circuit containing switching elements which, when the number of source output pulses or signals exceeds a predetermined threshold value, transmit a signal to a toggle stage for outputting an alarm signal.

Such type of smoke detector has been disclosed to the art, for instance, in the European Patent application No. 80/1326 and the published European Patent application No. 14,779. A radiation source is controlled by a pulse transmitter which transmits briefly lasting radiation pulses. The radiation receiver receives the radiation which is scattered throughout certain scattered volumetric regions by the smoke emanating from a combustion process, but also receives radiation which is reflected by the walls of the smoke detector.

For compensation of a transmitter and receiver against the effects of aging and temperature there has already been proposed in U.S. Pat. No. 4,180,742, granted Dec. 25, 1979, in the case of a scattered light detector operated with light or radiation whose intensity is constant as a function of time and containing a second identical receiver cell, to measure and regulate the transmitted light of the transmitter. However, such is insufficient for compensating against all possible changes due to contamination.

SUMMARY OF THE INVENTION

Therefore, with the foregoing in mind it is a primary object of the present invention to provide a new and improved construction of smoke detector which is not associated with the aforementioned drawbacks and limitations of the prior art.

Another and more specific object of the present invention is directed to a new and improved construction of smoke detector, the functional reliability of which is not impaired by any type of contamination and whose smoke sensitivity remains stable over longer time-spans.

A further significant object of the present invention is directed to a new and improved construction of smoke detector which delivers a disturbance signal when its contamination has progressed to such an extent that its functional reliability could be impaired.

Now in order to implement these and still further objects of the invention, which will become more readily apparent as the description proceeds, the smoke detector of the present development is manifested by the features that, there is provided at the direct radiation beam of the radiation source, near to the radiation receiver, a reference cell which controls the radiation transmission of the radiation source. Additionally, there is provided circuitry or means which adjust an amplitude threshold value set for the amplitude of the output signals from the radiation receiver, in the presence of slow changes in the amplitude of the receiver output pulse at a rate corresponding to a time-constant which is greater than one minute.

According to one design of the inventive smoke detector a radiation source positioned at the bottom thereof transmits towards the top light or a radiation beam in a substantially cone-shaped configuration. The primary radiation receiver is positioned at the top substantially centrally symmetrically, whereas the reference radiation receiver is positioned somewhat laterally at the top in the direct radiation path of the transmitter i.e. the radiation source. With this manner of positioning such components dust is only deposited upon the radiation source. On the other hand, condensation from the gases essentially uniformly covers or coats the primary radiation receiver and the reference receiver. The regulation of the light output of the transmitter by the measurement of the signal of the reference cell therefore furnishes a scattered signal at the primary receiver cell and which is independent of the contamination of the fire alarm or smoke detector, this scattered signal being produced by the effects of the smoke or the like entering the smoke detector.

The electronic circuit according to a further design essentially comprises an oscillator for the current supply of the radiation source, which current supply is regulated by the reference cell, an amplifier and an amplitude threshold value detector possessing differential properties and setting an amplitude threshold value for the amplitude of a difference pulse which is a function of the amplitude of the receiver output pulse. In the case of extremely slow changes in the amplitude of the receiver output pulses such as can be produced because of contamination, the amplitude threshold value is shifted as the amplitude of the receiver output pulse changes. with rapid increase of the receiver output pulse, such as produced by smoke emanating from a fire or other combustion process, the amplitude threshold value only inappreciably changes. Upon reaching the predetermined threshold value for the number of source output pulses the toggle stage is triggered. The amplitude threshold value detector has differential properties and is therefore capable of correcting the slow changes in the amplitude of the receiver output pulse. The combination of this amplitude threshold value detector with the evaluation circuit of the radiation pulse transmitter controlled by the reference cell produces a smoke detector which does not alter its smoke sensitivity even if it becomes more markedly contaminated. Additionally, the aging of the radiation source and the temperature-dependency are corrected.

It has been found to be advantageous to provide, in the aforementioned evaluation circuit arrangement, means for producing a blocking pulse, for instance by the electrical pulse of the oscillator, and means for forming a difference pulse from such blocking pulse and the output pulse of the radiation receiver. The difference pulse is then inputted as a reset signal to a counter device or counter. The counter is further switched by the source output pulses in the absence of the reset pulse and upon attaining a predetermined counter state constituting the predetermined threshold value for the number of source output pulses triggers an alarm signal. Such type of improved circuit configuration is particularly insensitive to electrical disturbances, especially high-frequency electrical disturbances, since such at most can simply generate an additional reset signal for the counter, so that the smoke detector becomes more foolproof against triggering of false alarms.

Additionally, the regulation of the radiation source also can be used in the following manner for triggering a disturbance signal. As long as the radiation source is completely readjusted or regulated by the reference cell, the smoke detector retains an unaltered smoke sensitivity. As soon as this switching circuit reaches the threshold or boundary of the regulation possibility, this phenomenon can be detected and there can be triggered a disturbance signal. Such detector therefore delivers a disturbance signal as long as it indeed still possesses a hardly altered smoke sensitivity, but soon would become insensitive due to further contamination or aging of the radiation source.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
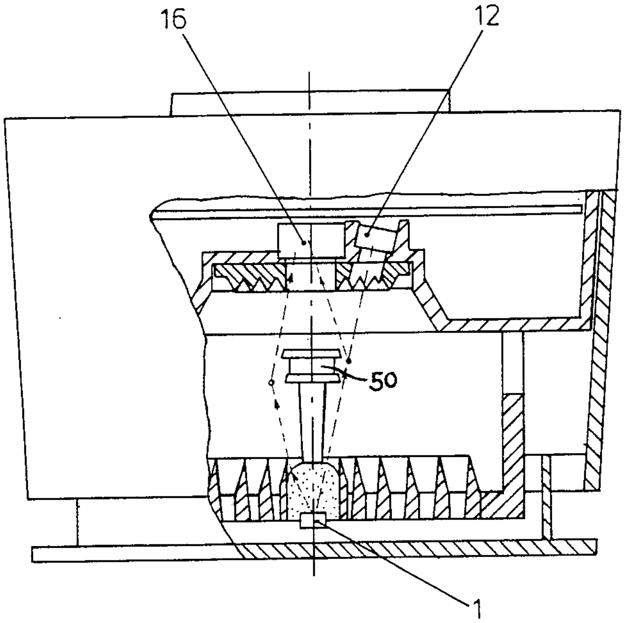
FIG. 1 schematically illustrates, partially in axial sectional view, a smoke detector containing a reference cell and constructed according to the invention.

Describing now the drawings, it is to be understood that only enough of the construction of the smoke detector has been shown as needed for those skilled in the art to readily understand that underlying principles and concepts of the present development, while simplifying the illustration of the drawings. Turning attention now specifically to FIG. 1, there has been shown in partial sectional view therein the construction of a smoke detector according to the invention. Such smoke detector will be seen to contain a radiation source 1 which transmits a substantially hollow cone-shaped beam of radiation into the enclosed space or compartment of the smoke detector. A central diaphragm 50 keeps direct radiation away from a radiation receiver 16. On the other hand, a reference cell 12 is positioned in the radiation cone. Due to this arrangement there is achieved the beneficial result that both the radiation receiver 16 and the reference cell 12 are subjected to the same degree of contamination. In particular, dust or other contaminants primarily deposit upon the radiation source 1, and thus, uniformly affect the reference signal and scattered light signal. As to further details of the smoke detector proper such constitutes subject matter of the aforementioned commonly assigned, U.S. application Ser. No. 06/439,060, filed Nov. 3, 1982, now granted as U.S. Pat. No. 4,524,281 on June 18, 1985.

Figure 2:
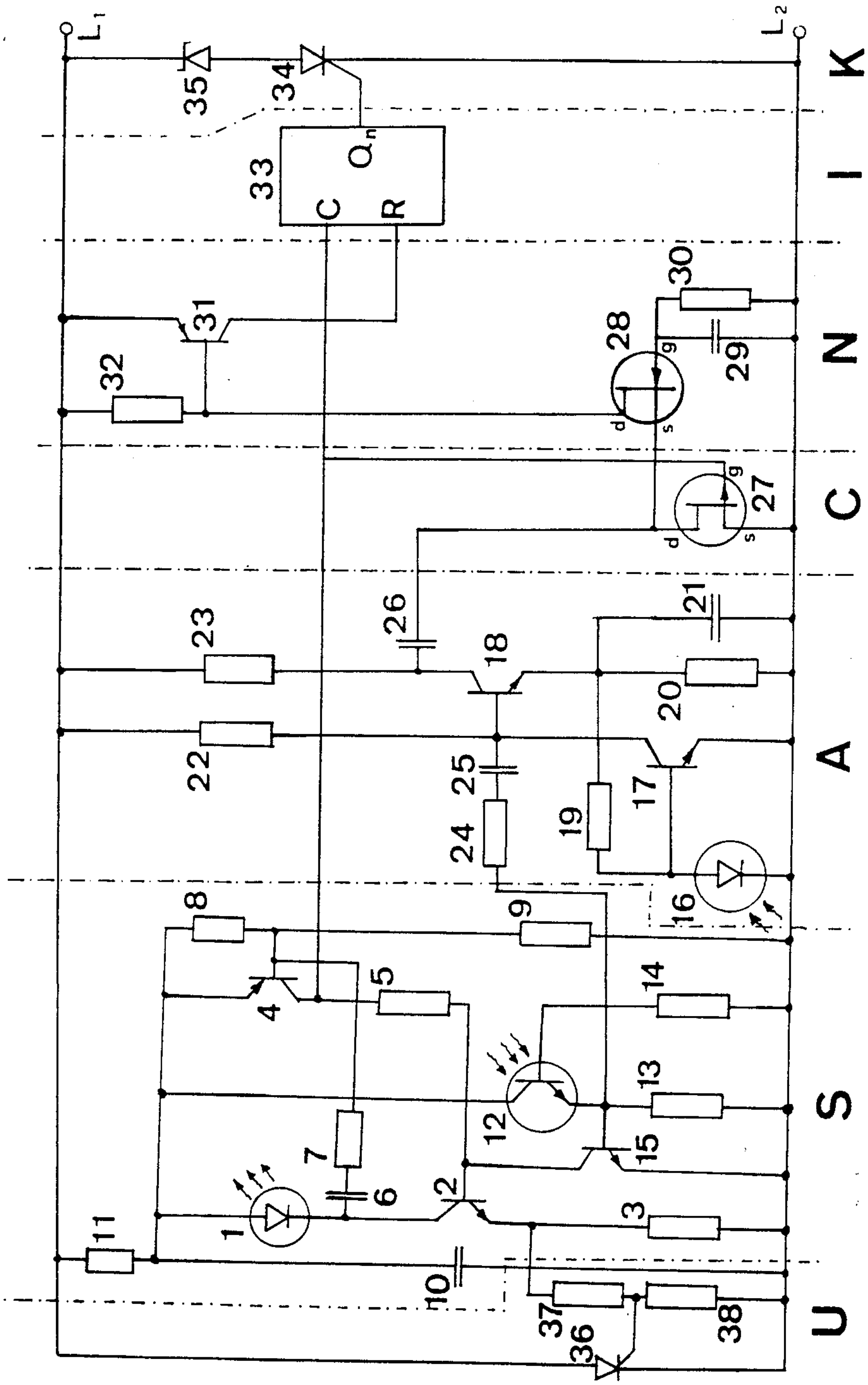
FIG. 2 is a detail circuit diagram of a preferred exemplary embodiment of smoke detector, particularly depicting the circuitry thereof.

Turning attention now to the circuitry illustrated in FIG. 2, which constitutes one exemplary embodiment of the inventive smoke detector, it will be seen that between two lines or conductors $L_1$ and $L_2$ which carry a direct-current voltage, there are arranged a radiation transmitter or transmitter section S, a radiation receiver or receiver section A, a correlator or correlator section C, a threshold value detector or detector section N, an integrator or integrator section I, an alarm toggle stage K, and a monitoring circuit or section having a toggle stage U.

The radiation transmitter S comprises an oscillator which conducts at a time interval of approximately two seconds a current of about 1 ampere lasting for about 100 microseconds through the radiation source 1. This radiation source 1 consists of a light or infrared-radiation emitting diode. The oscillator comprises a power transistor 2 with related limiter resistance or resistor 3, a control circuit composed of a transistor 4 with related limiter resistance or resistor 5, and a feedback element composed of the resistor 7 and capacitor 6. A large capacitor 10 delivers the current pulse for the radiation source 1. This capacitor 10 is charged by means of a resistor 11. The current pulse is triggered when the resistors or resistances 8 and 9 deliver a voltage to the base of the transistor 4 which renders such transistor conductive.

The current flowing through the light-emitting or luminescent diode, constituting the radiation source 1, is regulated by means of a reference cell 12, for instance a phototransistor or a photodiode 12 equipped with a measuring resistance or resistor 13 and a feedback resistor or resistance 14. As soon as the voltage at the resistance 13 is high enough, then a transistor 15 becomes somewhat conductive, and hence, reduces the base current of the power transistor 2. Instead of using a phototransistor or photodiode there can be, of course, also used a photocell.

The radiation pickup or receiving station A comprises a radiation receiver 16 constituted by a photocell and a two-stage amplifier composed of transistors 17 and 18, collector resistors 22 and 23, an emitter resistor 20 with a parallel connected capacitor 21 for greater pulse amplification, and a feedback resistor or resistance 19. By means of a resistor 24 and a capacitor 25 there is generated from the oscillator a blocking pulse. At the collector of the transistor 18 there thus appears by means of the coupling capacitor 26 a negative blocking pulse, to which there is added in the positive direction the amplified receiver output pulse from the radiation receiver 16 with the formation of a difference pulse. Instead of using a photocell there also can be employed as the radiation receiver 16 a phototransistor. Such then would simultaneously replace the transistor 17.

As to the correlator or correlator section C there is used therefor a self-conducting P-channel-depletion layer-field-effect transistor 27, the gate of which normally is low, whereby it is conductive and thus any possible spurious or interfering pulse is short-circuited. Only in the presence of the blocking pulse is the gate high and the FET 27 is then blocked, and thus, passes the difference pulse formed from the receiver output and blocking pulses to the amplitude threshold value detector.

The amplitude threshold value detector N comprises a self-conducting N-channel-depletion layer-field-effect transistor 28 and a holding stage containing the capacitor 29 and the high-ohm resistance 30. During each difference pulse the FET 28 is rendered conductive due to the negative character of the blocking pulse. This FET 28 then produces, by means of a transistor 31 containing a base resistance 32, a reset or suppression pulse or signal. At the same time the capacitor 29 is charged by means of the forward diode gate-source path of the FET 28. As long as the difference pulse amplitude remains unchanged the capacitor 29 essentially remains at the same potential. By means of the resistor 30 the capacitor 29 only slightly discharges and during the next difference pulse is again charged to the preceding potential. The FET 28 thus constitutes means for receiving and transmitting receiver output pulses in order to charge the capacitor 29 to a potential which defines the amplitude threshold value for the amplitude of the receiver output pulses. In the presence of extremely slow changes in the difference pulse amplitude there correspondingly follows the potential of the capacitor 29. The FET 28 thus also constitutes adjusting means for adjusting the amplitude threshold value. In the event that smoke penetrates into the smoke detector, then the magnitude of the difference pulse at the gate of the FET 28 becomes smaller. In the event that it becomes small enough the FET no longer is conductive during such difference pulse, so that there no longer is generated any reset pulse. As a consequence the FET 28 defines an amplitude threshold value for the amplitude of the receiver output pulse and enables the switching elements to generate the alarm signal whenever the amplitude of the receiver output pulse exceeds this amplitude threshold value, i.e. whenever the difference pulse formed from the blocking pulse and the receiver output pulse is insufficient to render the FET 28 conductive.

The integration stage I consists of a counter 33, for instance of the commercially available type MC 4024, which can be obtained from the well-known company Motorola Corporation, which receives source output or counting pulses from the oscillator of the radiation transmitter S during each radiation pulse. As long as reset pulses are produced it is, however, again reset to null by each such reset pulse. In the absence of the reset pulse the output $Q_n$ goes high after a predetermined number $2^{n-1}$ of source output pulses which represents the predetermined threshold value for the number of source output pulses.

The toggle stage K comprises the thyristor 34 which is controlled by the output $Q_n$ of the counter 33. The Zener diode 35 produces a voltage, for instance amounting to 6 volts, in order to differentiate the alarm state from the disturbance state.

The monitoring or monitor circuit U comprises a voltage divider containing the resistors or resistances 37 and 38 and the thyristor 36. The resistor 3 measures the current flowing through the radiation source 1. As soon as such current becomes too high and increases above a predetermined current threshold value because of contamination or aging of the radiation source 1, then the thyristor 36 is controlled or fired and thus delivers a disturbance signal. There can also b used an oscillator for delivering the disturbance signal and which short-circuits the conductors $L_1$ and $L_2$ for 0.5 to 10 seconds at a time interval of 20 to 200 seconds.

The illustrated construction of circuitry constitutes but one possible example. It is of course conceivable to also omit parts thereof, such as for instance the monitoring circuit U or the correlator C. The different elements also can be differently designed or constructed; for instance the differentiation of pulses in the amplitude threshold value detector also can be accomplished digitally by means of a counter and a digital-to-analog converter, as such has been illustrated in the circuit of FIG. 3.

Figure 3:
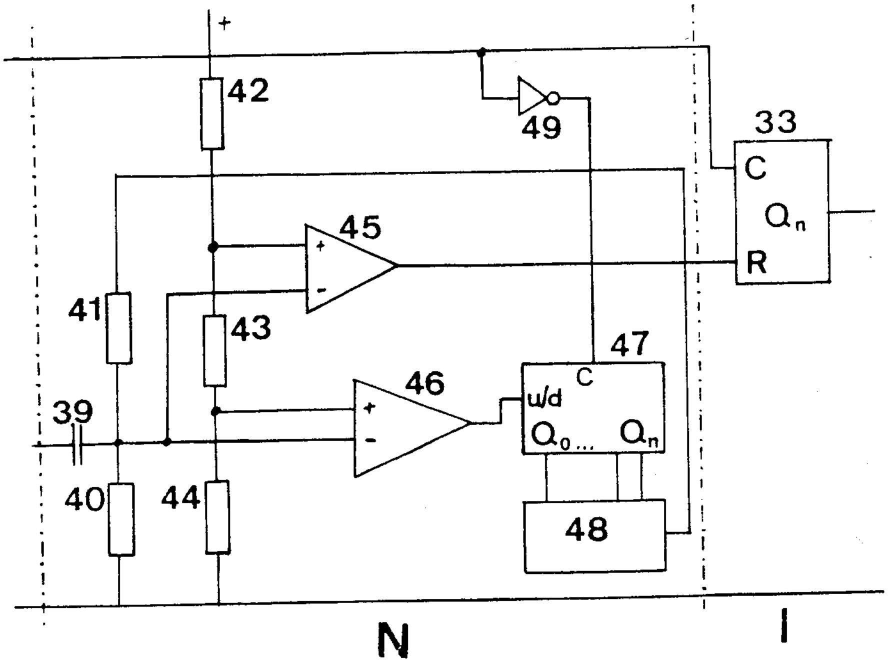
FIG. 3 illustrates a further circuit arrangement containing digital adjustment of the smoke detector.

Turning attention to such circuit of FIG. 3, it will be understood that by means of the coupling capacitor 39 the difference or pulse signal is added to the potential appearing at the voltage divider formed by the resistances or resistors 40 and 41 and is inputted to the inverting inputs of the comparators 45 and 46. These comparators 45 and 46 receive at their non-inverting inputs the voltages or potentials which are produced by the resistors 42, 43 and 44. At the end of each difference pulse, depending upon the state of the comparator 46, the source output pulse, which is inverted by the element 49, generates a state of the counter 47 which is higher or lower by 1. The counter 47 may be the commercially available counter type MC 14516, which is likewise available from Motorola Corporation. The state of the counter 47 generates by means of the parallel digital-to-analog converter 48 the input direct-current voltage by means of the resistors or resistances 41 and 40. Due to this circuit design there is achieved the result that in the rest condition or state the voltage of the difference pulse at the inverting input just oscillates about the voltage or potential at the non-inverting input of the comparator 46. With more rapid reduction in the magnitude of the difference pulse the counter 47 cannot adjust such potential or voltage. As soon as the difference pulse no longer attains the potential appearing at the non-inverting input of the comparator 45 there is no longer produced any reset pulse and the counter 33 is no longer reset. This type of circuitry also can be used in a detector circuit without any blocking pulse.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A smoke detector comprising:

a radiation source operated in a pulsed mode;

said radiation source delivering a beam of radiation and source output pulses corresponding to the pulsed mode operation of said radiation source;

a radiation receiver arranged externally of a direct radiation region of the radiation source;

said radiation receiver in the presence of smoke in the radiation region being impinged by scattered radiation and delivering receiver output pulses of an amplitude corresponding to the scattered radiation received by the radiation receiver;

an evaluation circuit containing switching elements which, when the number of source output pulses exceeds a predetermined threshold value for the number of the source output pulses, deliver a signal to a toggle stage for outputting an alarm signal;

a reference cell located in a direct beam of the transmitted radiation emanating from the radiation source and arranged near to the radiation receiver;

said reference cell controlling the transmission of radiation from the radiation source;

means for setting an amplitude threshold value for the amplitude of said receiver output pulses delivered by said radiation receiver;

means for adjusting said amplitude threshold value for the amplitude of said receiver output pulses delivered by said radiation receiver;

said adjusting means adjusting said amplitude threshold value, in the presence of slow changes in the amplitude of the receiver output pulse, to an adjusted amplitude threshold value at a rate corresponding to a time-constant greater than one minute;

said adjusting means being operatively connected with said switching elements contained in said evaluation circuit;

said adjusting means, in the presence of either no change or said slow changes in said amplitude of said receiver output pulses relative to said set amplitude threshold value, blocking said switching elements contained in said evaluation circuit from delivering said signal to said toggle stage for outputting said alarm signal; and said adjusting means, in the presence of an amplitude of said receiver output pulses in excess of said set amplitude threshold value, enabling said switching elements contained in said evaluation circuit to deliver said signal to said toggle stage for outputting said alarm signal.

2. The smoke detector as defined in claim 1, wherein:

the radiation source is located at a lower end region of the smoke detector; and said radiation receiver and said reference cell being located at an upper region of said smoke detector.

3. The smoke detector as defined in claim 2, wherein: said reference cell comprises a phototransistor.

4. The smoke detector as defined in claim 2, wherein: said reference cell comprises a photodiode.

5. The smoke detector as defined in claim 1, further including:

means which in the presence of each pulse regulates the current of the radiation source such that the reference cell generates a predetermined signal.

6. The smoke detector as defined in claim 1, further including:

means which regulates during each pulse the current of the radiation source to a predetermined level; and said reference cell slowly adjusting said level.

7. The smoke detector as defined in claim 1, wherein:

said adjusting means comprises a capacitor which is adjusted by said receiver output pulse to a potential determined by the amplitude of the receiver output pulse;

means for receiving and transmitting said receiver output pulses to said capacitor in order to charge said capacitor to said potential which defines said amplitude threshold value;

said capacitor, in the presence of said slow changes in the amplitude of said receiver output pulses, following said slow changes and being charged to an adjusted potential which defines said adjusted amplitude threshold value;

said means for receiving and transmitting said receiver output pulses to said capacitor being operatively connected to said switching elements and supplying to said switching elements, in the presence of either no change in the amplitude of said receiver output pulse or of said slow change in the amplitude of said receiver output pulse, a suppression signal preventing the deliverance of said signal to said toggle stage for outputting said alarm signal; and said means for receiving and transmitting said receiver output pulse to said capacitor being operatively connected to said switching elements and, in the presence of said receiver output pulse exceeding said set amplitude threshold value, enabling deliverance of said signal from said switching elements to said toggle stage for outputting said alarm signal.

8. The smoke detector as defined in claim 1, further including:

means for producing a blocking pulse;

means for generating a reset signal when the value of the difference of the blocking pulse and the receiver output pulse exceeds said amplitude threshold value;

an integrator arranged after said generating means; and said generating means delivering said reset pulse thereof to the integrator.

9. The smoke detector as defined in claim 7, wherein:

said adjusting means for the amplitude threshold value comprises a depletion layer-field-effect transistor;

said capacitor comprising a holder capacitor provided at the gate of said depletion layer-field-effect transistor; and the charging of the capacitor being accomplished by means of a gate-source path of said field-effect transistor and defining a forward diode.

10. The smoke detector as defined in claim 1, wherein:

said means for adjusting the amplitude threshold value comprises an up-down counter and a digital-to-analog converter.

11. The smoke detector as defined in claim 10, further including:

a comparator which controls the up-down counter for up or down counting; and the digital-to-analog converter which is controlled by the counter, controlling a direct-current voltage to which the receiver output pulse is added.

12. The smoke detector as defined in claim 7, further including:

a counter following said adjusting means and, in the presence of said receiver output pulses exceeding said set amplitude threshold value and after counting more than said predetermined threshold value for the number of source output pulses, controlling said toggle stage.

13. The smoke detector as defined in claim 1, further including:

means for measuring the current flowing through the radiation source and delivering a disturbance signal when such current exceeds a predetermined current threshold value.

14. The smoke detector as defined in claim 13, wherein:

said means for delivering said disturbance signal comprise a thyristor which is triggered when said predetermined current threshold value is exceeded.

15. The smoke detector as defined in claim 13, wherein:

said means for delivering said disturbance signal comprise an oscillator; and said oscillator short-circuiting conductors of said smoke detector for 0.5 to 10 seconds at a time interval of 20 to 200 seconds when said predetermined current threshold value is exceeded.

* * * * *

UNITED STATES PATENT AND TRADEMARK OFFICE
CERTIFICATE OF CORRECTION

PATENT NO. : 4,555,634
DATED : November 26, 1985
INVENTOR(S) : Jürg MUGGLI et al It is certified that error appears in the above—identified patent and that said Letters Patent is hereby corrected as shown below:

Column 1, line 8, please delete "Canadian" and insert --United States--

Column 2, line 43, please change "with" to --With--

Column 3, line 43, please change "that" to read --the--

Column 5, line 57, please change "b" to read --be--

Signed and Sealed this

*Twenty-fifth* Day of *March 1986*

[SEAL]

*Attest:*

DONALD J. QUIGG

*Attesting Officer* *Commissioner of Patents and Trademarks*